(12) United States Patent
Qi et al.

(10) Patent No.: US 7,869,809 B2
(45) Date of Patent: Jan. 11, 2011

(54) RADIO RESOURCE MEASUREMENT AND ESTIMATION

(75) Inventors: Emily H. Qi, Portland, OR (US); Mousumi Hazra, Beaverton, OR (US); W. Steven Conner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 984 days.

(21) Appl. No.: 11/128,844

(22) Filed: May 13, 2005

(65) Prior Publication Data

US 2006/0258286 A1 Nov. 16, 2006

(51) Int. Cl.
*H04W 40/00* (2009.01)
(52) U.S. Cl. .................. 455/445; 455/41.2; 455/67.11; 455/67.13; 455/68; 455/69; 709/224; 709/238; 709/239; 709/240; 709/242; 709/243; 709/244; 370/230.1; 370/231; 370/232; 370/235; 370/236; 370/237; 370/238; 370/248; 370/252; 370/400; 370/401
(58) Field of Classification Search .................. 370/230, 370/230.1, 232, 235–238, 248, 249, 252, 370/312, 313, 315, 328, 329, 349, 356, 389, 370/390, 392, 400–401, 432, 477; 709/241, 709/223, 224, 231, 235, 238–244; 455/445, 455/11.1, 41.2, 67.11, 67.13, 67.14, 67.16, 455/68–69
See application file for complete search history.

(56) References Cited

U.S. PATENT DOCUMENTS

| 6,891,796 | B1 * | 5/2005 | Manis et al. ................ 370/229 |
| 7,280,483 | B2 * | 10/2007 | Joshi .......................... 370/238 |
| 7,522,571 | B2 | 4/2009 | Ginzburg |
| 2005/0070279 | A1 | 3/2005 | Ginzburg et al. |
| 2006/0203805 | A1 * | 9/2006 | Karacali-Akyamac et al. .......................... 370/352 |
| 2006/0223524 | A1 * | 10/2006 | Ginzburg .................... 455/424 |

* cited by examiner

*Primary Examiner*—Tuan A Tran
(74) *Attorney, Agent, or Firm*—Schwegman, Lundberg & Woessner, P.A.; Gregory J. Gorrie

(57) ABSTRACT

Apparatus and systems, as well as methods and articles, may operate to conduct radio measurement request and response operations between two stations to determine receive channel power indicator values associated with direct and indirect wireless links, and to select one of the links for use by the stations based on estimated link capacities.

15 Claims, 4 Drawing Sheets

RADIO RESOURCE MEASUREMENT AND ESTIMATION

RELATED APPLICATIONS

This disclosure is related to pending U.S. patent application Ser. No. 11/205,857, titled "Proactive Network Aware Direct and Indirect Link Selection for Improved Performance of Wireless LANs", filed on Aug. 17, 2005.

TECHNICAL FIELD

Various embodiments described herein relate to wireless communication technology generally, including apparatus, systems, and methods used in measuring link quality and estimating link capacity.

BACKGROUND INFORMATION

Radio measurement request and response operations are permitted between an access point (AP) and a station (STA) in an infrastructure basic service set (BSS) under some Institute of Electrical and Electronic Engineers (IEEE) 802.11 standards. However, such operations are not allowed between STAs within a BSS.

For further information regarding various IEEE 802.11 standards (e.g., IEEE 802.11e and 802.11k), please consult "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments.

DETAILED DESCRIPTION

Figure 1A:
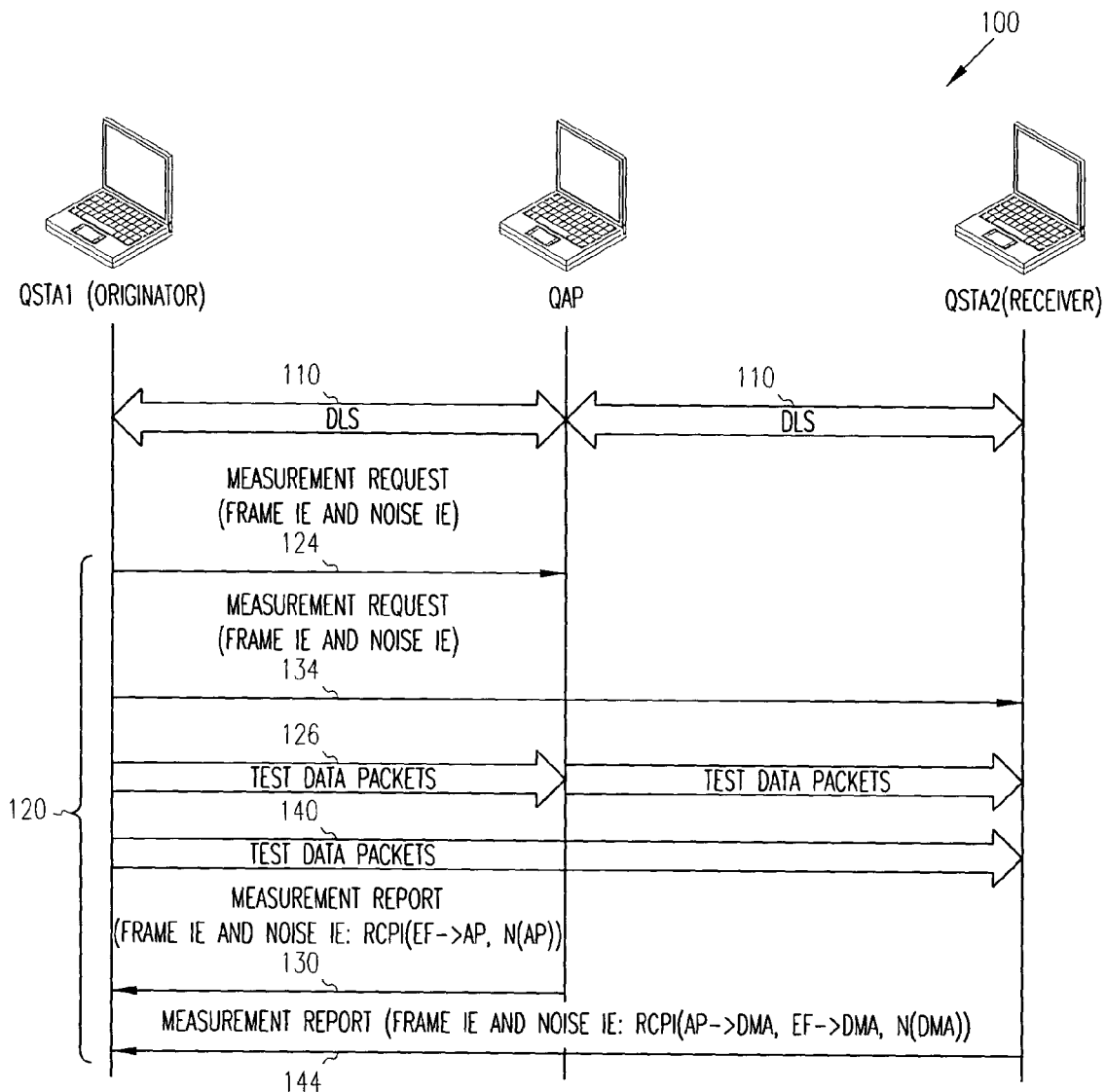
FIGS. 1A and 1B are a message flow diagram and frame request format, respectively, for measurement request and response operations conducted according to various embodiments of the invention.
Figure 1B:
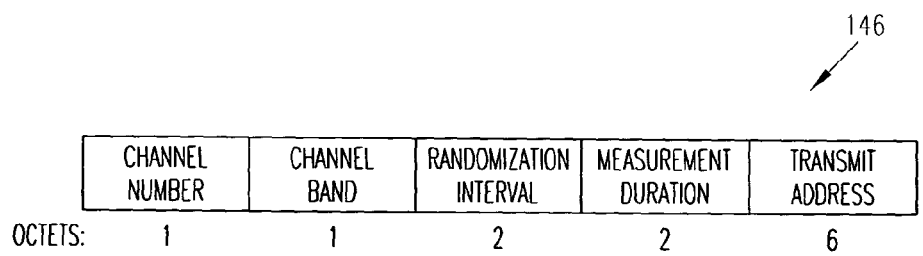

FIGS. 1A and 1B are a message flow diagram and frame request format, respectively, for measurement request and response operations conducted according to various embodiments of the invention. Such activities may operate to extend radio measurement request and response operations to a direct link between stations (STAs), so that an STA may estimate link capacity for the direct link to another STA, as well as for the indirect (e.g., two-hop) link through an AP. These activities may also permit selection of a link based on capacity before regular data communication begins.

In one example, the IEEE 802.11e standard may define a protocol, such as the Direct Link Setup (DLS) protocol, that permits the transmission of frames directly from one STA to the other without going through an AP. This protocol is useful, for example, in cases where a STA in power-save mode is awakened by an AP such that direct transmission to the awakened STA from another STA is enabled. The DLS protocol may also enable the exchange of rate set and other information between the originator STA and the receiver STA.

The link between non-AP STAs may be called a direct link (DL). Once a DL between an originator STA (QSTA1) and a receiver STA (QSTA2) is established using the DLS protocol, QSTA1 and QSTA2 can conduct between themselves the radio measurement request and response operations that may be defined, for example, in the IEEE 802.11k standard.

Some embodiments may include a mechanism to gather the received channel power indication (RCPI) value measured for the corresponding request frame, so that receiving STAs may report the RCPI measurement for a specified transmit STA or a specific frame. The measurement request (MR) frame format may be similar to or identical to that of the MR 146 format depicted in FIG. 1B. In one example, the MR may include a channel number field (CHN), a channel band field (CHB), a randomization interval field (RNDI), a measurement duration field (RNDD), and a transmit address field (XADD). In particular, the transmit address field may include a media access control (MAC) address (e.g., six bytes) of the STA transmitting the requested measuring frame. If the value of the transmit address is set to zero, the receiving STA may report the frame measurement for all frames that are received from multiple transmitter STAs. If the transmit address is set to a non-zero value, the receiving entity (STA or AP) should report the RCPI measured over frames received specifically from the STA having the non-zero transmit address. The measurement duration field may be set to the preferred duration of the requested measurement. If the measurement duration is set to zero, the receiving STA may report an RCPI value measured for the currently-received measurement request frame.

Referring now to FIG. 1A, the reader may assume the glossary of definitions shown in TABLE I is in effect for the remainder of this document.

Referring now to FIG. 1A, the reader may assume the glossary of definitions shown in TABLE I is in effect for the remainder of this document.

TABLE I

Let QSTA1 be the originator STA.
Let QSTA2 be the receiver STA.
Let QAP be the AP.
Let RCPI be a Receive Channel Power Indicator.
Let RCPI(QSTA1→QAP) be the RCPI of the link from QSTA1 to the QAP, measured by QAP.
Let RCPI(QAP→ QSTA2) be the RCPI of the link from the QAP to QSTA2, measured by QSTA2.
Let RCPI(QSTA1→ QSTA2) be the RCPI of the link from QSTA1 to QSTA2, measured by QSTA2.
Let C(QSTA1→QAP→QSTA2) be the capacity of the "indirect link," defined as the link from QSTA1 to the QAP to QSTA2.
Let C(QSTA1→ QSTA2) be the capacity of the "direct link," defined as the link between the non-AP stations QSTA1 and QSTA2.
Let N(QAP) be the noise histogram measured at the QAP.
Let N(QSTA1) be the noise histogram measured at QSTA1.
Let N(QSTA2) be the noise histogram measured at QSTA2.

In some embodiments, radio resource measurement and link capacity estimation may operate according to the flow diagram 100. First, the QSTA1, the QAP, and the QSTA2 may use the DLS protocol to set up a DL between the QSTA1 and the QSTA2 (e.g., as defined in IEEE 802.11e) at 110. As described in detail below, the QSTA1, QSTA2, and QAP may then make several measurements to obtain values for RCPI (QSTA1→QAP), RCPI(QAP→QSTA2), RCPI (QSTA1→QSTA2), N(QAP), and N(QSTA2) at 120.

To obtain the RCPI(QSTA1→QAP) and N(QAP) values, the QSTA1 may send an MR, perhaps comprising a measurement request action frame (MReqAF), to the QAP at 124. The MReqAF may include two measure request information elements: a frame request information element (IE) and a noise histogram request IE.

In the frame request measurement IE, the transmit address (TA) may be set to the QSTA1 to indicate that the QAP should report only the RCPI value measured over the frames received from the QSTA1. The measurement duration (MD) may be set to zero to indicate that the RCPI should be measured only for the current MReqAF.

To obtain the RCPI(QAP→QSTA2), RCPI (QSTA1→QSTA2) and N(QSTA2) values, the QSTA1 may send an MReqAF to the QSTA2 at 134. This MReqAF may also include two measure request information elements: a frame request IE and a noise histogram request IE. In the frame request measurement IE, the transmit address field may be set to zero to indicate that the QSTA2 is to report the RCPI value measured over the frames received from all transmit addresses which include the QSTA1 and the QAP. The MD may be set to zero to indicate that the RCPI is to be measured only for the current MReqAF, or a beacon frame that is received from the QAP.

The QSTA1 may also specify the MD, even when the QSTA1 will be sending one or more test data packets. Thus, the QSTA1 may optionally send test data packets to the QSTA2 through the QAP at 126. If the MD is set to zero in the frame request IE, the QAP may report the measured RCPI value over the MReqAF and the QSTA2 may report the measured RCPI value over the beacon frame that is received from the QAP; otherwise the QAP and the QSTA2 may report an average RCPI measured over one or more test data frames. In response, the QAP may send an Measurement Response Action Frame (MResAF) to the QSTA1 with values for RCPI (QSTA1→QAP) and N(QAP) included, at 130.

The QSTA1 may specify the MD, even when the QSTA1 is going to send one or more test data packets. Thus, the QSTA1 may optionally send test data packets to the QSTA2 at 140. The test data packets may be sent from the QSTA1 to the QSTA2 via the QAP. If the MD is set to zero in the Frame IE, the QSTA2 may report the RCPI value measured over the MReqAF as the value for RCPI(QSTA1→QSTA2), and the RCPI measured over the beacon frame as the value for RCPI (QAP→QSTA2). If measurement duration is not set to zero, the QSTA2 may report an average RCPI value measured over one or more test data frames. In response, the QSTA2 may send an MResAF back to the QSTA1 with RCPI (QSTA1→QSTA2), RCPI(QAP→QSTA2), and N(QSTA2) values included, at 144.

Various embodiments may operate to estimate the DL and indirect link capacities, perhaps selecting the link with greater estimated capacity to communicate data and other information. For example, as is known to those of skill in the art, available link capacity (C) can be estimated by using the formula: C=data rate*Clear Channel Fraction.

Since the data rate may be a function of the RCPI and signal-to-noise ratio (SNR) values, the data rate for the DL between the QSTA1 and the QSTA2 (e.g., link (QSTA1→QSTA2)), and the indirect link between the QSTA1 and the QSTA2 (e.g., link (QSTA1→QAP) and link (QAP→QSTA2)) may be described using the notation of Table II:

TABLE II

D1 = Date Rate (QSTA1→ QSTA2) = Function (RCPI(QSTA1→ QSTA2), N(QSTA2))
D2 = Data Rate (QSTA1→ QAP) = Function (RCPI(QSTA1→ QAP), N(QAP))
D3 = Data Rate (QAP→QSTA2) = Function (RCPI(QAP→QSTA2), N(QSTA2))

Thus, the DL Capacity $C1 = C(QSTA1 \rightarrow QSTA2) =$ Clear Channel Fraction*$D1$ (1)

and the Indirect Link Capacity $C2 = C(QSTA1 \rightarrow QAP \rightarrow QSTA2) =$ Clear Channel Fraction*$D2$*$D3/(D2+D3)$ (2)

The clear channel fraction may be the same in Equations (1) and (2) because the direct and indirect links may operate on the same channel. To select a link for use (e.g., either the DL or the indirect link) a comparison may be made as follows:

If $D1 \geq D2$*$D3/(D2+D3)$,
    the QSTA1 may select the DL for communications;
else
    the QSTA1 may select the indirect link for communications.

Figure 2:
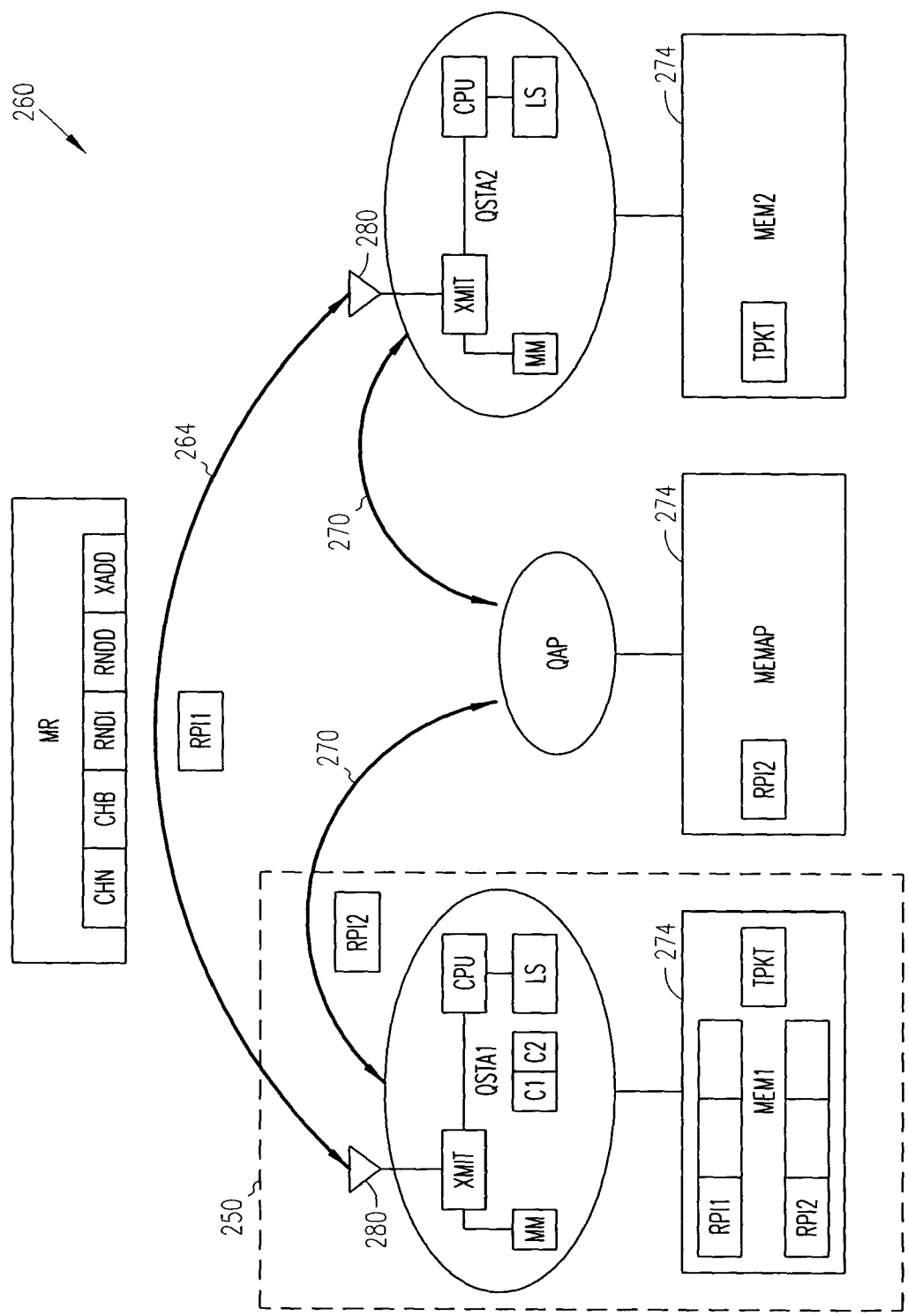
FIG. 2 is a block diagram of apparatus and systems according to various embodiments of the invention.

FIG. 2 comprises a block diagram of an apparatus 250 and a system 260 according to various embodiments of the invention, which may operate to measure RCPI values, estimate link capacities, and select a DL or an indirect link for communications, as described above. In some embodiments, an apparatus 250 may include a link selection module LS included in a first station QSTA1 to select a direct wireless link 264 to a second station QSTA2, or an indirect wireless link 270 to the second station QSTA2. The selection may be responsive to a first estimated link capacity C1 based on a first RCPI value RPI1 associated with the direct wireless link 264, and a second estimated link capacity C2 based on a second RCPI value RPI2 associated with the indirect wireless link 270.

In some embodiments, the apparatus 250 may include one or more memories 274 to store a frame including an RCPI value RPI1, as well as one or more test packets TPKT to send from the first station QSTA1 to the second station QSTA2 through the direct wireless link 264 and the indirect wireless link 270.

The apparatus 250 may include a processor CPU to calculate the first estimated link capacity C1 and the second estimated link capacity C2. Each of the stations QSTA1 and QSTA2 may include one or more transmitters XMIT to transmit measurement requests MR (e.g., one shown as 146 in FIG. 1), perhaps including a transmit address field XADD. The measurement request MR may further include one or more of a channel number field CHN, a channel band field CHB, a randomization interval RNDI, and a randomization duration RNDD. The stations QSTA1, QSTA2 may operate according to an IEEE 802.11 standard, such as the IEEE 802.11e and 802.11k standards.

Other embodiments may be realized. For example, a system 260 may include one or more of the apparatus 250, as described previously. In addition, the system 260 may include one or more antennas 280, such as omnidirectional, monopole, dipole, or patch antennas, coupled to one or more link selection modules LS, either directly or indirectly (as shown in FIG. 2).

In some embodiments, the system 260 may include multiple STAs, such as QSTA1 and QSTA2. Thus, for example, a rental service or reseller may rent/sell multiple STAs, such as laptop computers, personal digital assistants, or cellular telephones that can select between a direct link 264 and an indirect link 270 between each other. The system 260 may also include one or more memories 274, such as the QAP memory MEMAP, to store multiple RCPI values (e.g., RPI1, RPI2), perhaps received from the QSTA1, the QSTA2, or the QAP. For example, the QSTA1 and the QSTA2 may include a measurement module MM to determine RCPI values based on measurements conducted over one or more specified frames (e.g., the MR frame) received at a specified STA.

Any of the components previously described can be implemented in a number of ways, including simulation via software. Thus, the apparatus 250; system 260; direct wireless link 264; indirect wireless link 270; memories 274; antennas 280; link capacities C1, C2; channel band field CHB; channel number field CHN; processor CPU; link selection module LS; measurement module MM; measurement requests MR; stations QSTA1, QSTA2; randomization interval RNDI; randomization duration RNDD; RCPI values RPI1, RPI2; transmit address field XADD; and transmitters XMIT may all be characterized as "modules" herein. The modules may include hardware circuitry, single or multi-processor circuits, memory circuits, software program modules and objects, firmware, and combinations thereof, as desired by the architect of the apparatus 250 and system 260 and as appropriate for particular implementations of various embodiments. The modules may be included in a system operation simulation package such as a software electrical signal simulation package, a power usage and distribution simulation package, a capacitance-inductance simulation package, a power/heat dissipation simulation package, a signal transmission-reception simulation package, or any combination of software and hardware used to simulate the operation of various potential embodiments. Such simulations may be used to characterize or test the embodiments, for example.

It should also be understood that the apparatus and systems of various embodiments can be used in applications other than making measurements and estimating link capacity for a DL between STAs. Thus, various embodiments of the invention are not to be so limited. The illustrations of apparatus 250 and system 260 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Figure 3A:
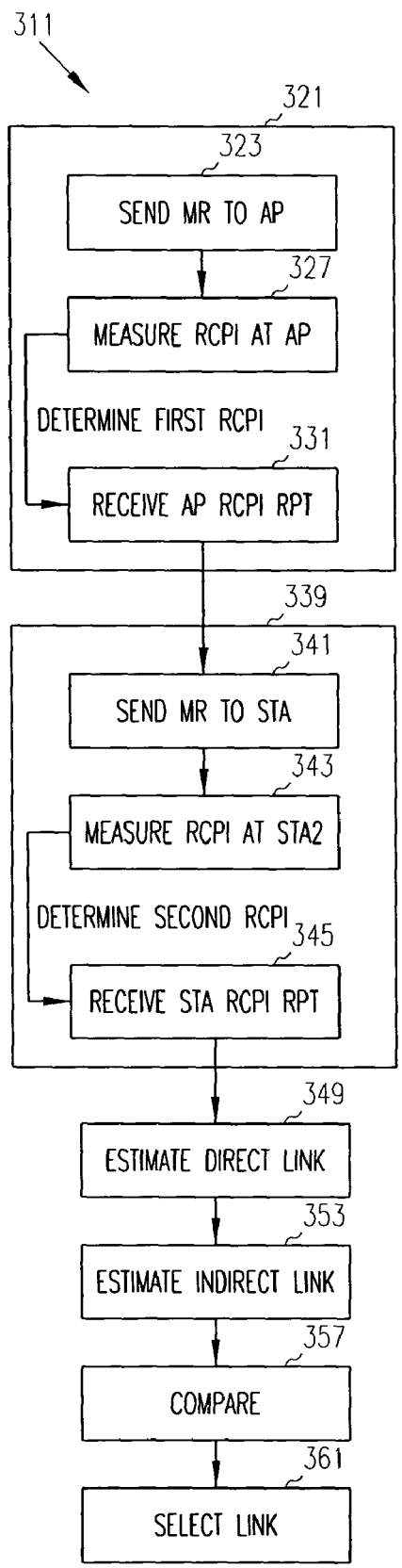
FIGS. 3A and 3B are flow diagrams illustrating several methods according to various embodiments of the invention.
Figure 3B:
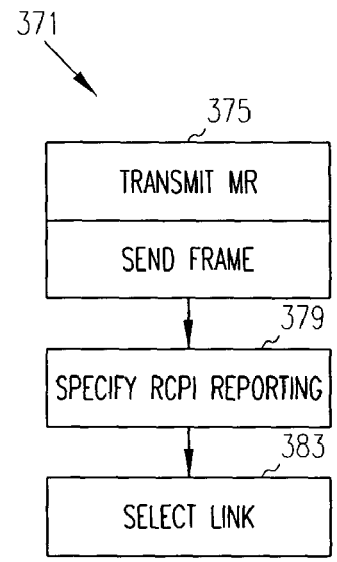

Some embodiments may include a number of methods. For example, FIGS. 3A and 3B are flow diagrams illustrating several methods 311 and 371 according to various embodiments of the invention. One such method 311 may begin at block 321 with conducting radio measurement request and response operations between two stations (e.g., an originator station QSTA1 and a receiver station QSTA2) to determine a first RCPI value associated with a direct wireless link, and to determine a second RCPI value associated with an indirect wireless link between the two stations at block 339. The radio measurement request and response operations may be conducted according to IEEE 802.11 standards, such as IEEE 802.11e and IEEE 802.11k standards. Measurement requests (MRs) may include an MReqAF, with one or more of a transmit address field, a channel number field, a channel band field, a randomization interval field, and a randomization duration field.

Determining the first RCPI value at block 321 may include sending an MR, including an MReqAF, from the originator station to the receiver station at block 323 (e.g., from the QSTA1 to the QSTA2), and measuring, at the receiver station, the first RCPI value at block 327. The method 311 may include receiving a report of the RCPI value associated with the link between the receiver station and the originator station at block 331 (e.g., the DL). The report may be received over a beacon frame (e.g., by conducting RCPI measurements over an MReqAF, a test data frame, or a beacon frame, among others).

Determining the second RCPI value at block 339 may include sending an MR, including an MReqAF, from the originator station to an AP (e.g., from the QSTA1 to the QAP) at block 341, measuring an RCPI value at the AP (e.g., the QAP) at block 343, and receiving a report of the RCPI value associated with a link between the AP and the originator station at block 345. As described previously, the RCPI value between the AP and the receiver station QSTA2 may also be measured. The report may be received over the MReqAF, and/or one or more test data frames, and or a beacon frame (e.g., by measuring the RCPI over the duration of the MReqAF, the test data frames, or a beacon frame).

The method 311 may include estimating a link capacity associated with the direct wireless link at block 349, and estimating a link capacity associated with the indirect wireless link at block 353. The method 311 may include comparing the link capacity associated with the direct wireless link to the link capacity associated with the indirect wireless link at block 357, and selecting one of the direct wireless link and the indirect wireless link to communicate information between the two stations based on the estimated link capacity derived from the first receive power channel indicator value and the second receive power channel indicator value, at block 361.

Referring now to FIG. 3B, it can be seen that in some embodiments, a method 371 may include communicating wirelessly between two stations according to an IEEE 802.11 standard, including transmitting an MR comprising a transmit address field, at block 375. As noted previously, the MR may also include one or more of a channel number field, a channel band field, a randomization interval field, and a randomization duration field.

Assuming the two stations comprise an initiator station and a receiver station, the method 371 may include sending a frame including the transmit address field to specify reporting an RCPI value with respect to one of a single originator station and a plurality of originator stations at block 379. The method 371 may include selecting a link for further communications between the two stations based on one or more of the RCPI values received in response to the measurement request at block 383.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Figure 4:
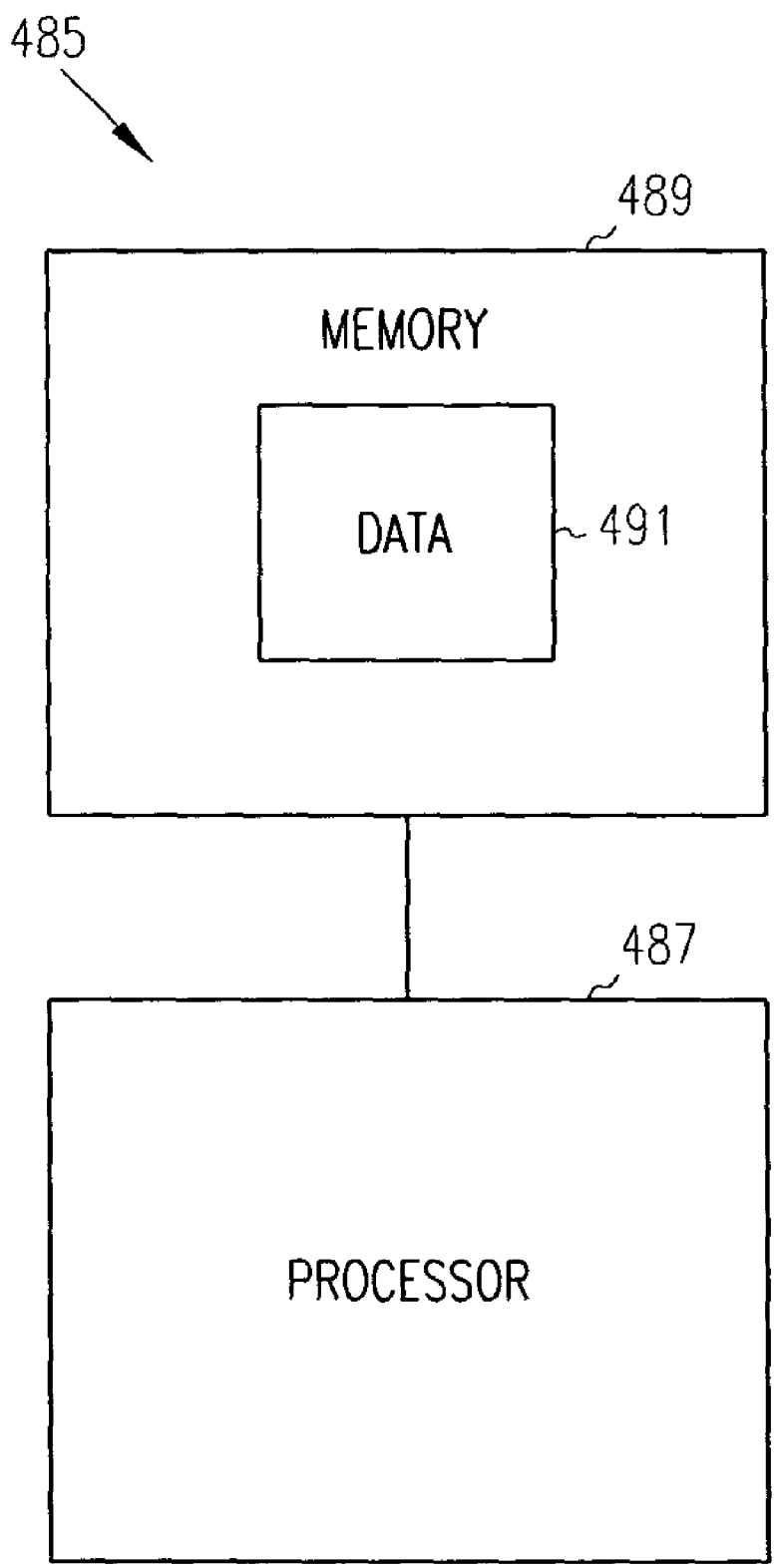
FIG. 4 is a block diagram of an article according to various embodiments of the invention.

Thus, other embodiments may be realized. For example, FIG. 4 is a block diagram of an article 485 according to various embodiments of the invention. Examples of such embodiments may comprise a computer, a memory system, a magnetic or optical disk, some other storage device, or any type of electronic device or system. The article 485 may include one or more processor(s) 487 coupled to a machine-accessible medium such as a memory 489 (e.g., a memory including an electrical, optical, or electromagnetic conductor). The medium may contain associated information 491 (e.g., computer program instructions, data, or both) which, when accessed, results in a machine (e.g., the processor(s) 487) communicating wirelessly between two stations according to a wireless communication protocol such as an IEEE 802.11 standard, including transmitting a measurement request comprising a transmit address field in an infrastructure BSS. Other activities may include sending a frame including the transmit address field to specify reporting one or more RCPI values with respect to one of a single originator station and a plurality of originator stations. Further activities may include selecting a link for further communications between the two stations based on an RCPI value received in response to the measurement request.

Implementing the apparatus, systems, and methods disclosed herein may permit STAs to independently determine link quality, both for a direct link from one STA to another, and for an indirect link, where one STA communicates with another via an AP. Such operation may enhance radio resource usage models defined in various IEEE 802.11 standards.

Although the inventive concept may be described in the exemplary context of an 802.xx implementation (e.g., 802.11a, 802.11g, 802.11 HT, 802.11k, 802.16, 802.20, etc.), the claims are not so limited. Embodiments of the present invention may well be implemented as part of any wired or wireless system. Examples may also include embodiments comprising multi-carrier wireless communication channels (e.g., orthogonal frequency-division multiplexing (OFDM), discrete multi-tone modulation (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A mobile station configured to operate as part of an infrastructure basic service set (BSS) that includes an access point and at least one other mobile station, wherein the mobile station is configured to perform a direct-link setup (DLS) protocol with the access point and the other mobile station to set up a direct link between the mobile station and the other mobile station, the mobile station comprising a link selection module to select either the direct link or an indirect link for communicating with the other mobile station based on channel information for the direct link and the indirect link, the direct link allowing for frames to be communicated directly between the mobile station and the other mobile station without use of the access point, the indirect link allowing for frames to be communicated between the mobile station and the other mobile station through the access point, wherein the link selection module is to solicit the channel information by sending a measurement request to the other mobile station over the direct link established by the DLS protocol.

2. The mobile station of claim 1 wherein the link selection module is further to solicit the channel information by sending a measurement request to the access point.

3. The mobile station of claim 2 further comprising:
a transmitter to transmit the measurement requests comprising a transmit address field; and
a processor to calculate link capacities of the direct and indirect links based on reports received in response to the measurement requests and to select either the direct or the indirect link based on the link capacities, wherein the reports are received either over beacon frames or test data frames.

4. The mobile station of claim 3, wherein the measurement requests further comprise one or more of a channel number field, a channel band field, a randomization interval field, and a randomization duration field.

5. The mobile station of claim 2, wherein the mobile station is configured to perform the DLS protocol within the basic service set in accordance with the Institute of Electrical and Electronics Engineers (IEEE) 802.11e standard, and wherein after the direct link is established in accordance with the DLS protocol, the mobile station and the other mobile station are configured to perform radio measurement request and response operations in accordance with the IEEE 802.11k standard to determine receive channel power indications (RCPIs) associated with the direct link and the indirect link.

6. A method performed by a mobile station configured to operate as part of an infrastructure basic service set (BSS) that includes an access point and at least one other mobile station, the method comprising:

performing a direct-link setup (DLS) protocol with the access point and the other mobile station to set up a direct link between the mobile station and the other mobile station;

selecting either the direct link or an indirect link for communicating with the other mobile station based on channel information for the direct link and the indirect link, the direct link allowing for frames to be communicated directly between the mobile station and the other mobile station without use of the access point, the indirect link allowing for frames to be communicated between the mobile station and the other mobile station through the access point; and soliciting the channel information by sending a measurement request to the other mobile station over the direct link established by the DLS protocol.

7. The method of claim 6 further comprising soliciting the channel information by sending a measurement request to the access point.

8. The method of claim 7 further comprising:

transmitting the measurement requests including a transmit address field; and calculating link capacities of the direct and indirect links based on reports received in response to the measurement requests; and selecting either the direct or the indirect link based on the link capacities, wherein the reports are received either over beacon frames or test data frames.

9. The method of claim 8, wherein the measurement requests further comprises one or more of a channel number field, a channel band field, a randomization interval field, and a randomization duration field.

10. The method of claim 7 wherein performing the DLS protocol comprises performing the DLS protocol within the basic service set in accordance with the Institute of Electrical and Electronics Engineers (IEEE) 802.11e standard, and wherein after the direct link is established in accordance with the DLS protocol, the method comprises the mobile station performing radio measurement request and response operations with the other mobile station in accordance with the IEEE 802.11k standard to determine receive channel power indications (RCPIs) associated with the direct link and the indirect link.

11. A computer-readable storage medium that stores instructions for execution by one or more processors to configure a mobile station to operate as part of an infrastructure basic service set (BSS) that includes an access point and at least one other mobile station, wherein the instructions configure the mobile station to:

perform a direct-link setup (DLS) protocol with the access point and the other mobile station to set up a direct link between the mobile station and the other mobile station;

select either the direct link or an indirect link for communicating with the other mobile station based on channel information for the direct link and the indirect link, the direct link allowing for frames to be communicated directly between the mobile station and the other mobile station without use of the access point, the indirect link allowing for frames to be communicated between the mobile station and the other mobile station through the access point; and solicit the channel information by sending a measurement request to the other mobile station over the direct link established by the DLS protocol.

12. The computer-readable storage medium of claim 11 wherein the instructions further configure the mobile station to further solicit the channel information by sending a measurement request to the access point.

13. The computer-readable storage medium of claim 12 wherein the instructions further configure the mobile station to:

transmit the measurement requests comprising a transmit address field; and calculate link capacities of the direct and indirect links based on reports received in response to the measurement requests; and select either the direct or the indirect link based on the link capacities, wherein the reports are received either over beacon frames or test data frames.

14. The computer-readable storage medium of claim 13, wherein the measurement requests further comprise one or more of a channel number field, a channel band field, a randomization interval field, and a randomization duration field.

15. The computer-readable storage medium of claim 12 wherein the instructions configure the mobile station to perform the DLS protocol within the basic service set in accordance with the Institute of Electrical and Electronics Engineers (IEEE) 802.11e standard, and wherein after the direct link is established in accordance with the DLS protocol, the instructions further configure the mobile station to perform radio measurement request and response operations with the other mobile station in accordance with the IEEE 802.11k standard to determine receive channel power indications (RCPIs) associated with the direct link and the indirect link.

* * * * *